United States Patent [19]

Henzl

[11] 4,124,676
[45] Nov. 7, 1978

[54] MECHANICAL BOND

[75] Inventor: Jerry Henzl, Crystal Lake, Ill.

[73] Assignee: Crane Packing Co., Morton Grove, Ill.

[21] Appl. No.: 727,676

[22] Filed: Sep. 29, 1976

[51] Int. Cl.² ............................................. B29D 9/00
[52] U.S. Cl. .................................. 264/250; 249/127; 264/127; 264/274; 428/422
[58] Field of Search ............... 428/119, 120, 161, 422; 264/274, 313, 318, 334, 127, 249, 370, 219, 275, 318, 230, 56, 60, 125, 250; 249/127, 183

[56] References Cited

U.S. PATENT DOCUMENTS

| | | | |
|---|---|---|---|
| 2,951,721 | 9/1960 | Asp | 264/127 |
| 3,529,858 | 9/1970 | Haller | 428/161 |
| 3,704,194 | 11/1972 | Harrier | 249/183 |
| 3,738,418 | 6/1973 | Harris | 249/183 |
| 3,975,131 | 8/1976 | Bergounhon | 249/127 |

FOREIGN PATENT DOCUMENTS 1,075,473  7/1976  United Kingdom ............... 428/161

*Primary Examiner*—Stanley S. Silverman

[57] ABSTRACT

A composite article having a first layer formed of one material and a second layer of a second material, said layers being mechanically bonded together by mating projections extending from one layer into cavities of said other layer, said cavities having inwardly diverging surfaces for receiving said projections to preclude axial separation of said layers. The disclosure also includes a process for the manufacture of such articles.

5 Claims, 8 Drawing Figures

MECHANICAL BOND

BACKGROUND OF THE INVENTION

This invention relates to a mechanically bonded composite article and to a process for its manufacture. A primary application of the invention is in the field of seals and gaskets.

Many plastics are often difficult to bond to one another or to elastomers. For example, articles of fused polytetrafluoroethylene (herein referred to as TFE) are not easily bonded to elastomers or to other materials. Yet, due to its low coefficient of friction and chemical inertness, this material provides advantages in the art of seals, gaskets, bearings and other environments. However, the application of TFE to this environment has been complicated by its high thermal coefficient of expansion, its lack of easticity and the difficulty of bonding it to other materials.

To overcome such complications, the prior art suggests the addition of an elastomeric layer to the fused TFE article. Thus, a composite TFE elastomer seal would provide the desired low friction and inertness of TFE, while the elastomer would provide elasticity and resilience. Prior art attempts to bond these materials have not been completely satisfactory. Adhesive bonding materials such as Hylene M-50 sold by E. I. duPont de Nemours & Co. has been suggested. Similarly, mechanical bonds have been used. These mechanical bonds have included the formation of interstices in one of the materials which are filled by the other material to achieve a mechanical interlock. These interstices may be formed by etching a sintered TFE article or by incorporating in the TFE powder a material such as methyl methacrylate which, upon sintering, vaporizes and leaves voids in the sintered article.

SUMMARY OF THE INVENTION

To provide a better mechanical bond between two plastic materials or between a plastic and an elastomer, the instant invention includes an article formed of two layers of diverse materials having mating projections and recesses or cavities between the two materials. Moreover, these projections and cavities are formed with diverging surfaces so as to define an interconnection in the nature of a dovetail. Preferably the process for forming this interconnection includes the use of an elastomeric mold section having projections extending therefrom. A first plastic resin is introduced into the mold, and compressed, the pressure deforming the elastomeric projections to define cavities in the first material having cavity walls inwardly diverging to define an inwardly expanding cavity. Upon removal of the pressure, the elastomeric projections return to their original relaxed position to permit removal of the first layer without distortion of the cavity. If this layer is of TFE or a cold formed material, the preform resulting from this step is then sintered into its final cured state. Subsequently, the first layer is placed in a second mold with another plastic or elastomer resin. Using heat and/or pressure, the plastic or elastomer resin takes a shape defined by the mold and simultaneously flows into the cavities of the first material to define a dovetail projection. Upon curing the composite article is removed for use.

Accordingly, it is an object of my invention to provide an improved mechanical bond between two plastic materials or between a plastic material such as TFE and an elastomeric material. Another objective of my invention is to provide composite TFE-elastomer seal in which the layers of a fused article and elastomeric material have a substantial resistance to axial separation. Too, the instant invention provides a method of bonding TFE to an elastomer having a lower cost - eliminating the etching or vaporizing steps required by the prior art. Finally, it is an object of my invention to provide an improved TFE-plastic seal or gasket.

DESCRIPTION OF THE DRAWINGS

The manner in which these and other objects of my invention are obtained is described in the following description and drawings in which.

DETAILED DESCRIPTION

Figure 1:
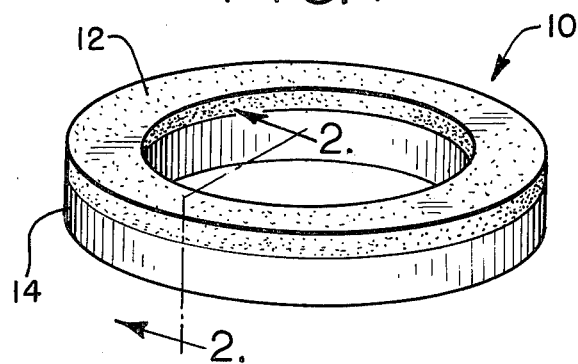
FIG. 1 is a perspective view of a composite plastic sealing element.

As shown in FIG. 1, a preferred embodiment takes the form of an annular ring 10. This ring is formed of an upper layer or ring 12 of cured TFE and a lower plastic or elastomeric ring 14. A preferred application for this article is in a sealing environment where the upper surface of the TFE disc might be placed in contact with a relatively rotating surface (not shown) to utilize its low friction characteristics. The lower elastomeric ring or disc is then compressed by an abutment or spring to maintain sealing contact between the TFE disc and the relatively rotating surface, and to accommodate thermal expansion of the TFE layer. This form and environment is merely suggestive. My invention also includes a composite article which has a superior bond between other materials and to the process for obtaining that bond.

Figure 2:
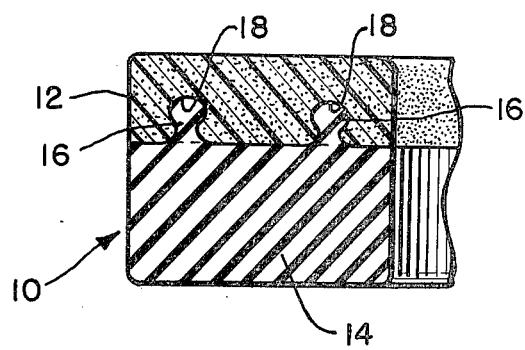
FIG. 2 is a side elevation of the preferred embodiment of invention taken along the lines 2—2 of FIG. 1.
Figure 3:
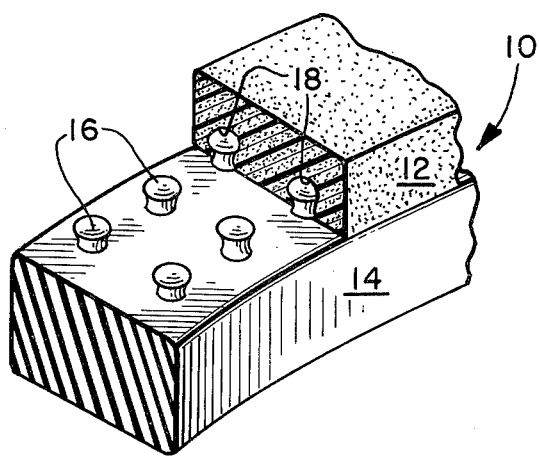
FIG. 3 is a perspective view of a preferred embodiment of the seal of FIG. 1 with portions broken away.

The details of this invention are best illustrated in FIGS. 2 and 3 in which the elastomeric material is formed with a plurality of upstanding projections 16 whose diameter expands towards its extremity in the nature of a dovetail. These projections mate with and fill cavities 18 of similar shape formed in the sintered ring 12 of TFE material. With this shape of mating cavities and projections, a strong mechanical interlock is formed and axial separation of the two layers 12 and 14 is most difficult. Moreover, relative rotation between these layers is precluded.

Figure 4:
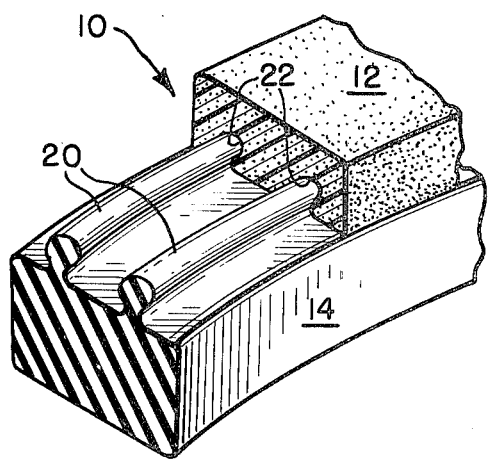
FIG. 4 is a perspective view of another embodiment of my invention with portions broken away.

A somewhat similar, but alternative embodiment, is depicted in FIG. 4. Here, however, the dovetail interlock is formed of two annular projections or ribs 20 on the elastomeric layer 14. The cross section of these ribs are enlarged towards its outer extremity. Similarly, the TFE layer 12 is provided with annular grooves 22 which receive these projections in interlocking relation.

An important feature in each of these embodiments, is the dovetail configuration of the projections. As shown, each projection extends upwardly into an enlargement which can be incapsulated by the cavities of the TFE disc. The apparatus and method of forming these cavities and projections is depicted in FIGS. 5 through 6.

Figure 5:
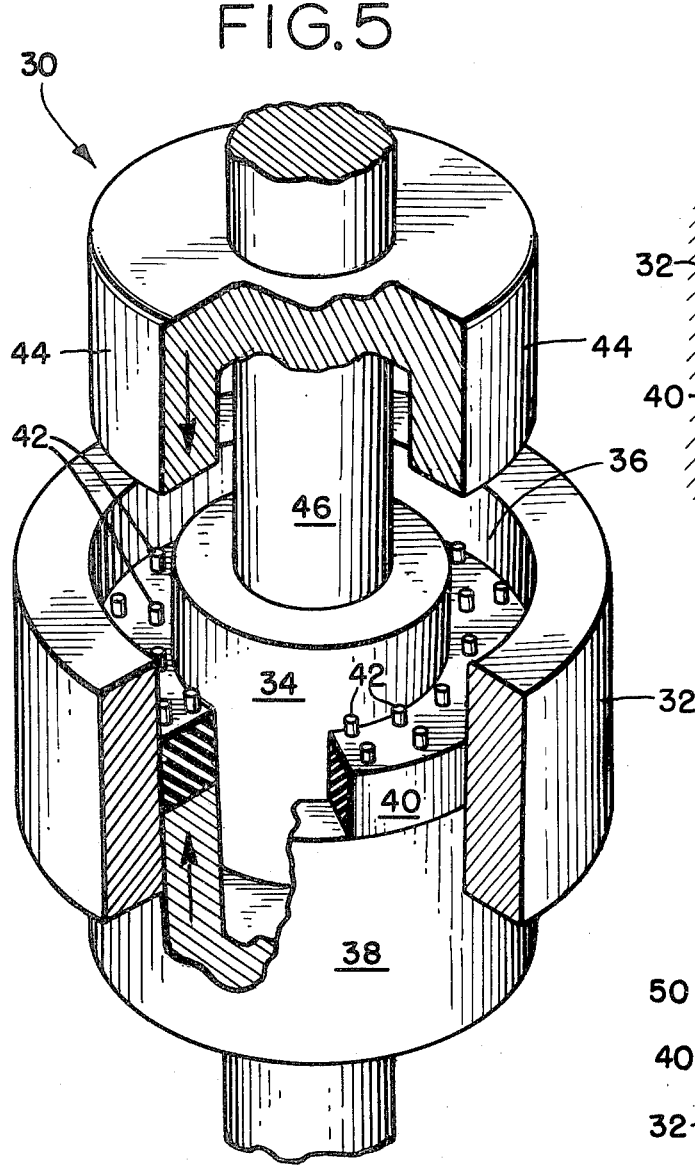
FIG. 5 is a perspective view of a preferred embodiment of an apparatus for making the teflon article of our invention with portions broken away.
Figure 6:
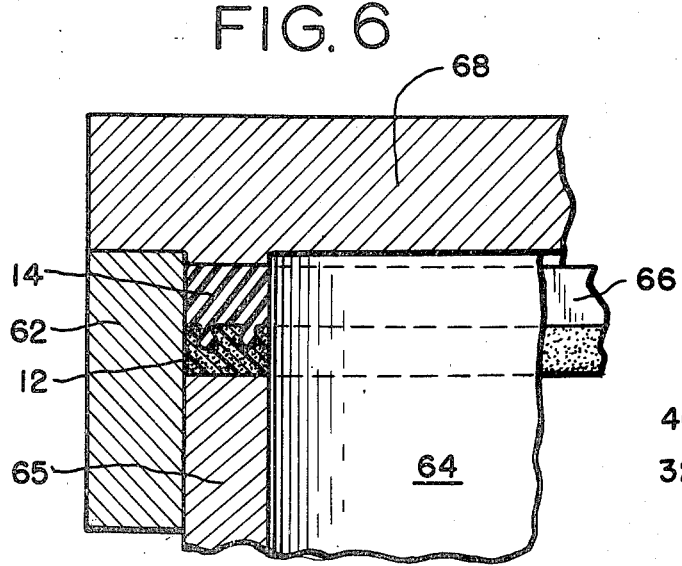
FIG. 6 is a preferred embodiment of apparatus for mechanically bonding the TFE article to an elastomeric material to form the seal of FIG. 1.
Figure 5C:
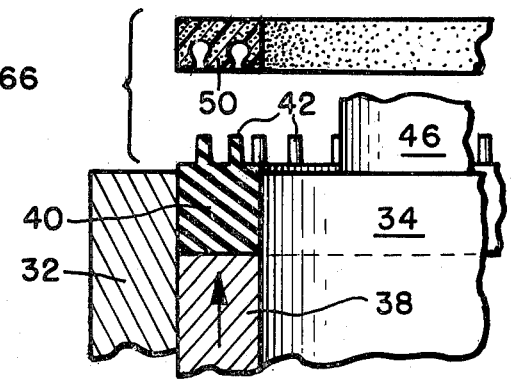

The apparatus of FIG. 5 is an annular mold 30 which includes an outer cylindrical support section 32 and an inner cylindrical section 34. This inner section 34 has a smaller external diameter than the inside diameter of section 32 so as to define a cylindrical cavity 36. Closing the bottom of cavity 36 is a cylindrical bottom member 38 which telescopes over inner section 34. Mounted upon the top surface of this bottom member is a resilient ring section 40 from which projections 42 extend upward. These projections, in their relaxed, unstressed state are straight and have a generally constant cross section. Finally, closing the top of the cavity 36 is an upper cylindrical member 44 whose vertical reciprocation may be guided by a rod 46 threadedly mounted in section 34.

Figure 5A:
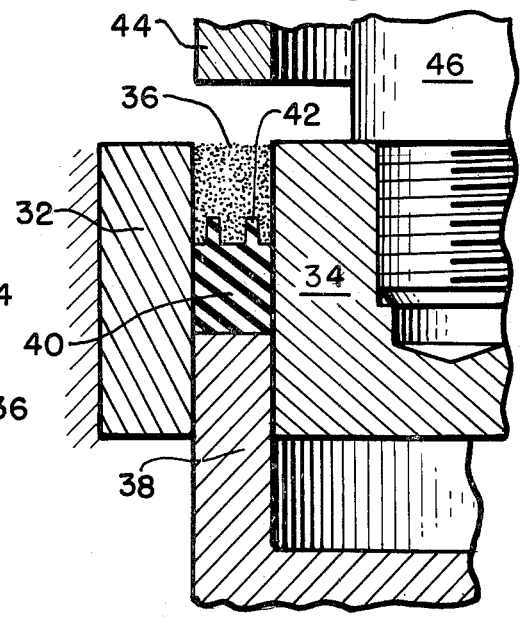
FIGS. 5a, 5b and 5c disclose the steps of making utilizing the apparatus of FIG. 5.
Figure 5B:
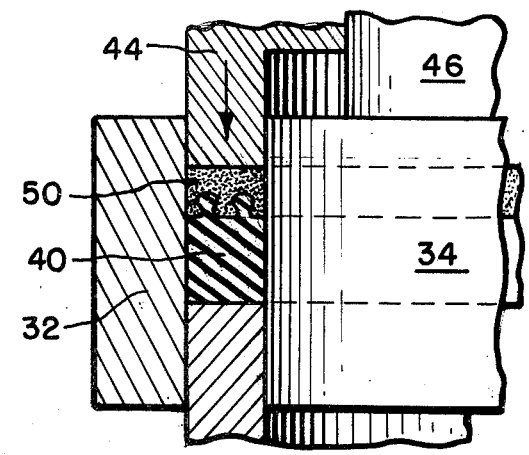

This mold 36 is used to form the TFE ring 12 of the composite article. As shown in FIG. 5a, powdered TFE resin is introduced into the cavity 36, the mold members 32, 34 & 38 being held in fixed position. After loading cavity 36, the upper member is lowered by a hydraulic cylinder (not shown) or the like, to compress or cold form the TFE powder into a preform 50. This compressive force not only compresses the powder, but also distorts the projections 42 of the resilient mold member 40 as shown in FIG. 5b. This distortion preferably takes the form of a mushroom bulging the projections and effecting irregular distortions to define cavities 18 in the preform 50 which are smaller at their bases than at the extremity or, at the least, are misshapen, having sidewalls which are not perpendicular to the bottom surface of the preform 50.

One unique aspect of my invention is to retain the shape of the distorted cavity 18 TFE preform. Upon release of pressure from member 44, the resilient projections 42 return to their relaxed normal shape. Such permits simultaneous retraction of member 44, without disruption of the enlarged cavity 18 formed by compression. Subsequently, the preform 50 is ejected by reciprocating member 38 upward as shown in FIG. 5. Then, the preform is placed in an oven for sintering to define the cured disc 12.

After fusing, the TFE layer 12 is then inverted and placed in a second mold 6 of FIG. 6. This mold is quite similar to that of FIG. 5, having a fixed outer cylindrical member 62, and an internal cylindrical member 64. The entire mold is formed of metal and includes no elastomeric mold section 40 as in FIG. 5. In use, elastomeric material 66 or another plastic is introduced in the cavity 68 above the TFE disc 12 and the top section 68 of the mold is closed. By the application of heat and pressure in conventional manner, the elastomer is caused to flow downward into the cavities 18 and is cured. Subsequently, the upper member is raised as with the mold in FIG. 5 with the composite article 10 also being ejected in a similar manner. This process results in the composite article generally depicted in FIG. 3 with the exception that the projections 42 and the cavities 18 may not be uniform due to the random distortion of the resilient projections 42. Nevertheless, such projections, having irregular surfaces deformed at an acute angle to the plane joining the two layers, results in a mechanical interlock to preclude axial separation. A similar distortion occurs in the annular projections of the embodiment of FIG. 4 with the exception that the primary distortion occurs in a radial direction.

Figure 7:
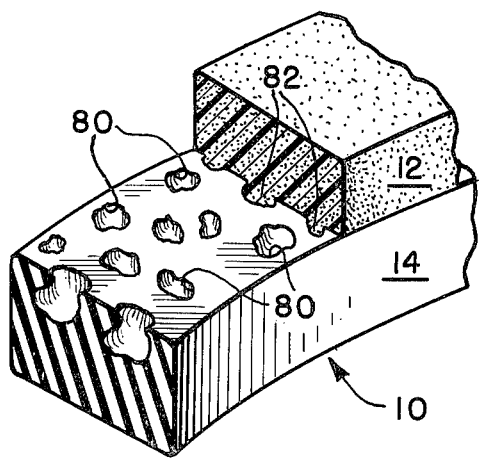
FIG. 7 is a perspective view of another embodiment of our invention.
Figure 8:
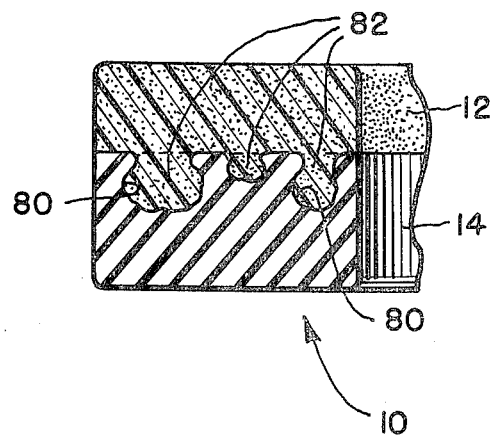
FIG. 8 is a side elevation view in section of the embodiment of FIG. 7.

The embodiment of my invention disclosed in FIGS. 7 and 8 is formed in a somewhat different manner. Here, the lower disc 14 was formed with irregular cavities 80 while the TFE disc is formed with the projections 82. This reversal of projections 80 and cavities 82 has also been found to obtain a desired interference lock between the two discs.

While the invention has been disclosed with reference to an annular composite ring, the object may take various shapes. Similarly, the shape of the projections of the flexible mold 40 as well as the mold cavities to form the species of FIGS. 7 and 8 may be varied. The height and shape of such mold cavities and projections may vary depending upon the thickness of the layers of material and the nature and direction of external forces applied to the composite article.

The mold of FIG. 5 works very well with resins which are first cold formed and then cured. Additionally, this mold may be used to form cavities of the desired configuration in thermosetting plastic materials such as phenolics and acetal Polymers. Similarly, thermoplastic or thermosetting resins might be injected into the cavity 36 after mold 30 is closed. If thermoplastics are so injected, the resilient mold section 40 should be formed of a high temperature resistant elastomer such as Viton, a flouro elastomer commercially available from E. I. duPont de Nemours & Co. Additionally, release agents may be used to preclude the plastic from adhering to the elastomer. Alternatively, in some instances the mold section 40 might be used to form the second layer 14. In this event, the composite article is completed upon discharging the composite layers from the mold.

Also, the lower disc 14 may be formed of other plastics or elastomers by placing or injecting same into a mold (such as that shown in FIG. 6) with the upper disc 12. The various uses of the mechanical bonding process will be dependent upon the need or desirability of bonding various materials.

I claim:

1. A method for forming interlocking cavities in a plastic article comprising:
    (a) introducing a plastic resin into a mold cavity having resilient projections extending from a surface thereof;
    (b) compressing said resin for distorting said resilient projections and for forming cavities in the resin with distorted, irregular wall surfaces within said compressed resin; and
    (c) permitting said resin to cure into a solid article.

2. A process as recited in claim 1 in which said resin is polytetraflouroethylene and said resin is cured by the application of heat.

3. A process as recited in claim 1 including the steps of:
    (a) placing the cured resin article into a second mold; and
    (b) injecting an elastomer into said second mold and into said cavities of said article;
    (c) curing said elastomer to form a composite plastic elastomer article.

4. A process for bonding polytetraflouroethylene to another plastic material comprising the steps of:

(a) introducing polytetraflouroethylene powder into a mold cavity having elastomeric projections extending from a surface thereof;

(b) compressing said powder to deform said projections and to define a preform having cavities with irregular distorted wall surfaces;

(c) sintering said preform into a cured polytetraflouroethylene article;

(d) placing said cured article into a second mold;

(e) introducing an elastomeric material to be bonded to said article into said mold, and causing a portion of same to flow into said cavities of said article;

(f) curing said elastomeric material.

5. A process for bonding a polytetraflouroethylene article to an elastomer comprising the steps of:

(a) introducing polytetraflouroethylene resin into a mold having at least one resilient surface, said surface having resilient projections extending therefrom;

(b) compressing said resin and said resilient surfaces to produce a cold formed polytetraflouroethylene preform having an irregular surface for accommodating a mechanical bond thereto;

(c) sintering said preform into a cured polytetraflouroethylene article;

(d) applying an elastomer to said distorted surface of said polytetraflouroethylene to mechanically bond same thereto.

* * * * *